W. H. STONE.
Improvement in Plow-Colters.
No. 114,220.  Patented April 25, 1871.
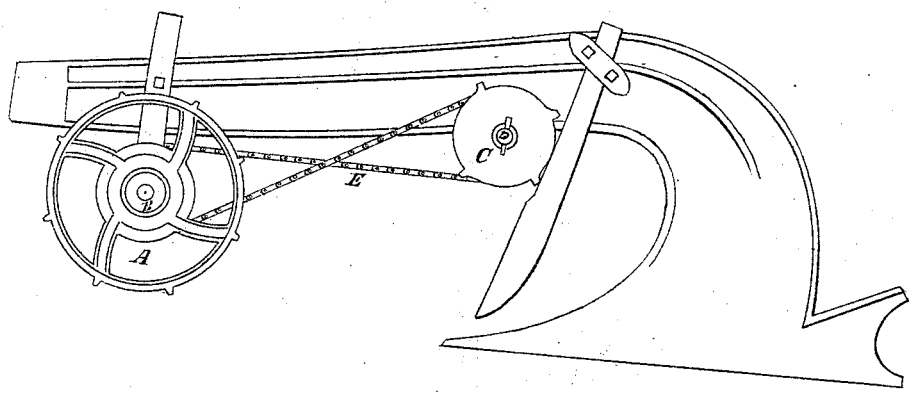
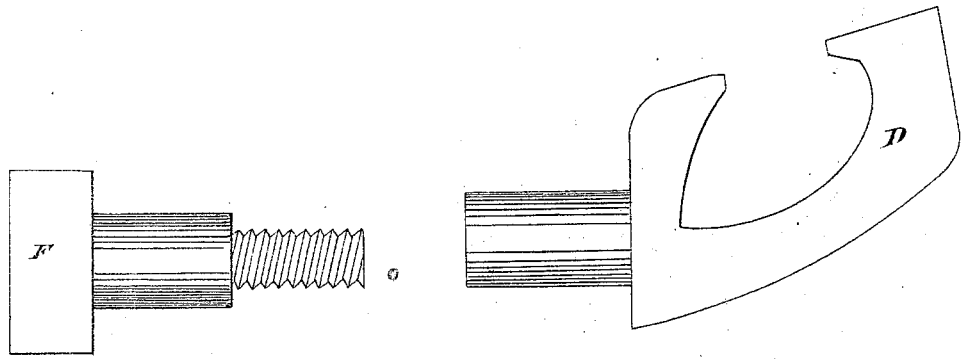
WITNESSES  INVENTOR

UNITED STATES PATENT OFFICE.

WARREN H. STONE, OF LEBANON, MICHIGAN.

IMPROVEMENT IN PLOW-COLTERS.

Specification forming part of Letters Patent No. 114,220, dated April 25, 1871.

*To all whom it may concern:*

Be it known that I, WARREN H. STONE, of Lebanon, Clinton county, State of Michigan, have invented a new and useful machine, the object of which is to clear away the accumulating straws, stubble, manure, sods, or other obstructions that accumulate upon the colter or lug of the common field-plow when in use in stubble-fields plowing under straws, clover, or manure, to be known as the "Combined Champion Colter and Plow-Cleaner;" and I do hereby declare that the following is a full, clear, and exact description of the construction and operation of the same, reference being had to the annexed drawing, making part of this specification.

The nature of my invention consists in so combining a pronged sheave-wheel, placed in position in front of the colter or lug of the plow, with a wheel having a sheave attached and running in the place of the common jack-wheel on the forward end of the plow-beam, said pronged sheave-wheel being connected together by a small endless chain or band-rope and a clasp, with a horn or axle projecting to hold the pronged sheave-wheel in place upon the plow-beam for iron-beam plows, and an axle with a wood-screw cut on one end to hold the pronged sheave-wheel in position when attached to wooden-beam plows, the forward or driving-wheel to have projections on the surface of the rim to prevent its slipping when in for the purpose of cleaning accumulations, rubbish, from the colter or lug of the plow. It has for a long time been the study of inventors, and anxiously wished for by farmers, that some means might be devised by which the constantly-accumulating straws, clover, stalks, manure, stubble, and other obstructions might be cleared from the colter or lug of the plow without constant watching and effort upon the part of the plowman. To this end many devices have been resorted to without obtaining the object so earnestly desired; but by my invention the difficulties heretofore encountered are overcome and the operation of keeping the plow colter or lug cleared of rubbish is accomplished in the most easy and satisfactory manner.

The figure represents a side view, showing a part of the common plow (upon which I do not claim any improvement) with my invention attached thereto.

To enable others skilled in the art to make and use my invention, I proceed to describe the construction and operation of the same.

Letters of like name and kind refer to like parts in the figure.

A is a wheel, made of cast-iron or other suitable material, with the rim projecting to the landside, upon which are projecting spurs or cogs, to prevent slipping when in labor.

B is a plain sheave-wheel, made of cast-iron or other suitable material, cast or riveted on the inside or beam side of the wheel A.

C is a sheave-wheel, with prongs of any desired length, and any number of them projecting on the land side and passing downward on the land side of the colter or lug of the plow.

D is a clasp, with a horn or axle projecting on the land side of the plow-beam for the purpose of holding the sheave-wheel C in its proper place, when at work, on iron-beam plows.

E is an endless chain or rope, used to connect the sheave-wheel B to and with the sheave-wheel C, giving it its proper motion.

F is an axle, with a screw cut on the smaller end for the purpose of attaching the sheave-wheel C to wooden-beam plows.

Having thus described my invention, what I claim as new, and desire to secure by Letters Patent, is—

The combination of the wheel A, sheave B, pronged sheave-wheel C, clasp and axle D and F, with endless chain E, or their equivalents, all for the purposes and substantially as herein described.

WARREN H. STONE.

Witnesses:
PORTER K. PERRIN,
ALBERT J. BALDWIN.